United States Patent Office 3,561,264
Patented Feb. 9, 1971

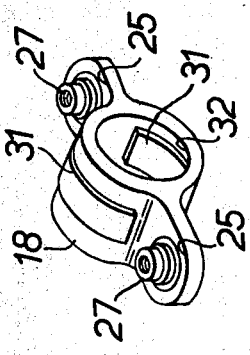
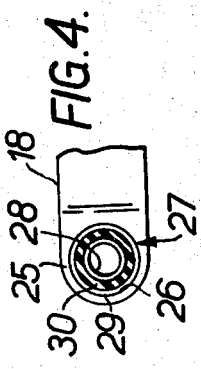
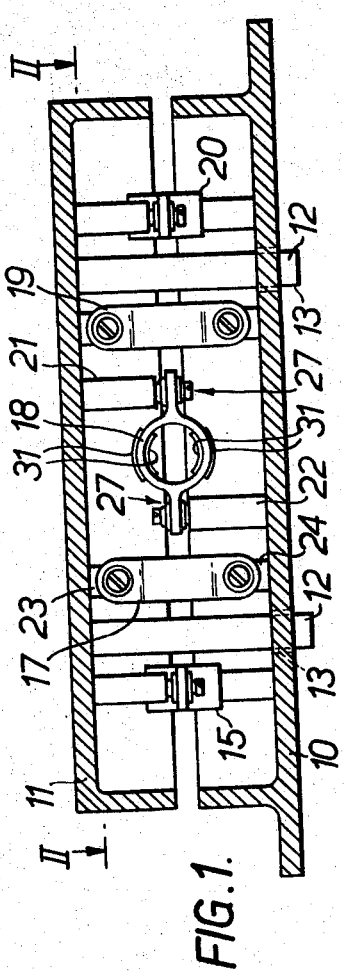
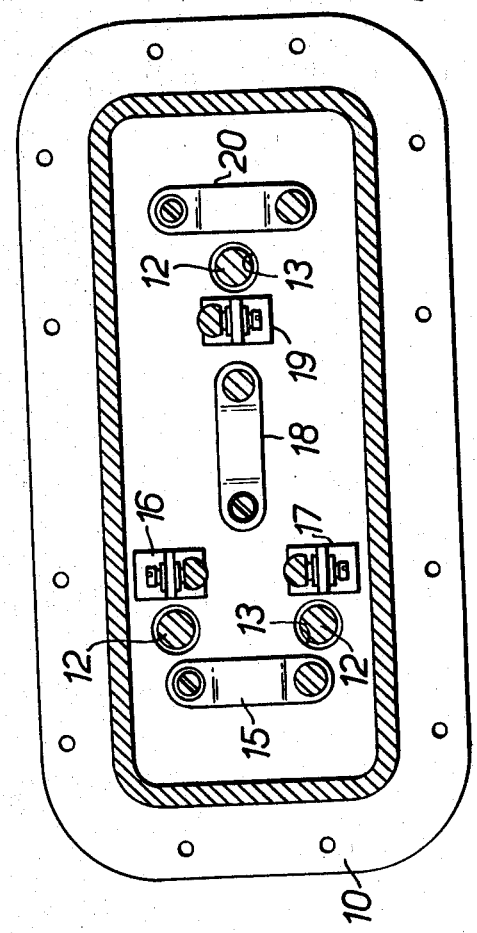

3,561,264
BALANCE FOR USE IN WIND TUNNELS
Ernest Frederick Needham, Highcliffe, and Kenneth Vincent Blanchard, Bottisham, Cambridge, England, assignors to Tracked Hovercraft Limited, London, England, a British company
Filed Mar. 12, 1969, Ser. No. 806,567
Claims priority, application Great Britain, Mar. 13, 1968, 12,269/68
Int. Cl. G01l 5/16; G01m 9/00
U.S. Cl. 73—147                                                     7 Claims

ABSTRACT OF THE DISCLOSURE

A balance for testing models in a wind tunnel is located entirely within the model and includes a frame connected to the model and a sub-frame rigidly connected to ground. Interconnecting the frame and sub-frame are six separate links adapted together to sense the three forces and three moments produced on the model in the normal three dimensions. The links sense only end-loading and are in the form of rings so that end loads cause bending strain of the rings which is measured by strain gauges.

---

This invention relates to a balance for supporting models and other items to be tested in a wind tunnel.

The conventional way of measuring the forces exerted on a model for a wind tunnel is to support the model either on a normal mechanical balance installed outside the tunnel working area, or on the end of a "sting." The sting is a probe-like device and the forces are measured by measuring strains and bending moments inside the sting.

There are two disadvantages of existing apparatus. Firstly, mechanical balances providing physical separation of the six components of loading on the model are large and cumbersome and normally built into each tunnel and each model has to be rigged individually to the balance by means of struts or wires. This support structure affects the balance loading and has to be calibrated and thus productive tunnel operating time is wasted in two ways. Secondly, in the case of a "sting" balance, it is not normally possible to arrange for complete physical separation of the six components of loading and consequently there is a liabiliay to interaction between the different modes, resulting in difficult calibration requirements.

An object of the invention is to provide a compact portable balance, capable of measuring the different forces acting on the model.

According to the invention, there is a balance for testing models or other items in a wind tunnel, the balance including a frame adapted ot be connected to the model, and a sub-frame which in use can be rigidly attached to ground or to a fixed structure, the frame being connected to the sub-frame through six separate links adapted together to sense the three forces and three moments which are produced on the model in the normal three dimensions, the links being arranged to sense only end-loading.

The links are preferably connected to the frame and sub-frame with mountings including a bush of elastomeric material. A rubber bush of the type known as "Silentbloc" (registered trademark) may be used.

Instead of a rubber bush, a thin resilient diaphragm of metal may be used as the joint, or a knife edge may be used. If the loadings are not so high as to introduce undesirable hysteresis, a ball joint may be used.

The links are preferably in the form of rings, so that end-loads cause bending strain of the rings. The strain is preferably measured by a strain gauge or gauges attached to the side of the ring. The strain gauges employed may be sensitive semi-conductor gauges, avoiding the need for electrical amplification of the signal.

By using six links carrying only end-load it is possible substantially to isolate physically each of the six components of loading to a unique path of reaction. It is therefore possible, by indicating the end-loads in the links on suitable measuring instruments to measure the forces on the balance in three orthogonal directions and the moments in the corresponding three planes directly and continuously.

Preferably the strain gauge balance can be entirely enclosed within the model. It is therefore self-contained and can be taken to a wind tunnel and set up without having to use the tunnel balance. The instrumentation necessary can be built and calibrated in a laboratory and transported with the model, so that the whole balance is self-contained.

The positions of the links can be modified according to the type of model which is being tested. For instance, if yawing moments are likely to be the largest moments involved, then the two links involved in measuring yaw will be put furthest apart. The thickness of the rings can be increased if the potential loading is high, so as to avoid over-loading the rings and so as to avoid excessive movement.

In the accompanying drawings:

FIG. 1 is a side elevation partly in section of a strain gauge balance for use in testing the model in a wind tunnel, the balance being in accordance with the present invention;

FIG. 2 is a plan section through the balance along the line II—II in FIG. 1;

FIG. 3 is a perspective view of a link for the balance;

FIG. 4 is a view of part of the link; and

Figure 5:
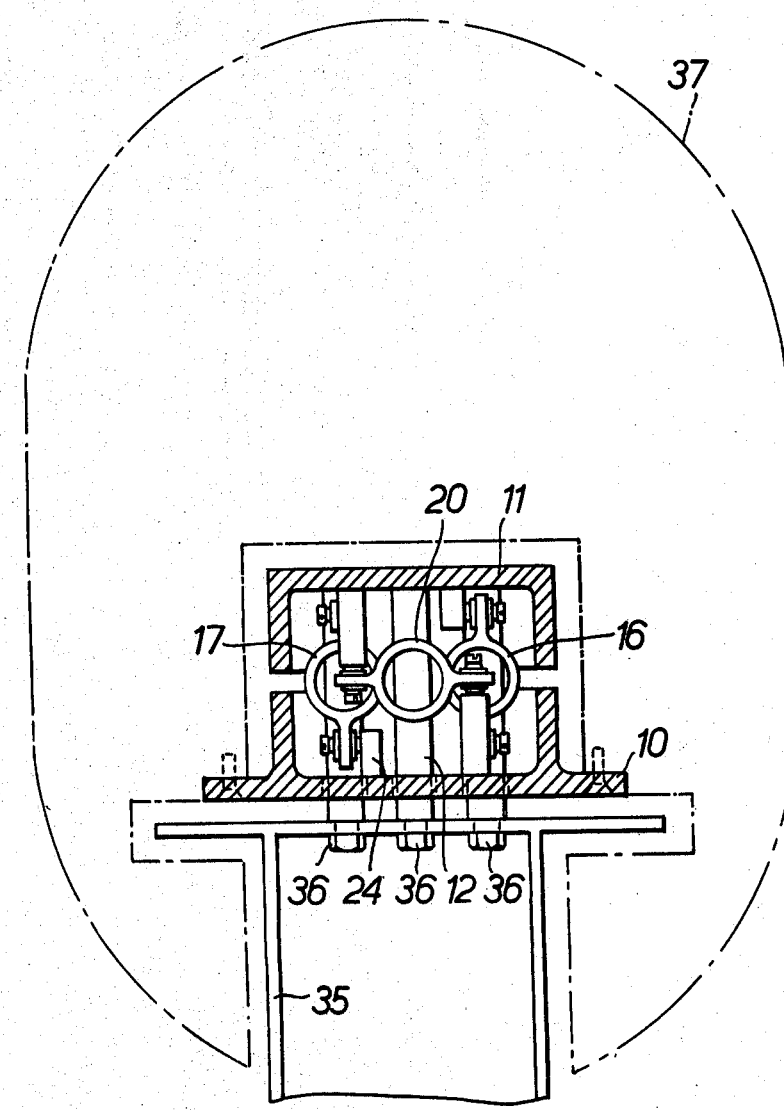
FIG. 5 shows an end view of the balance partly in section mounted within a model and ready for insertion in a wind tunnel.

The balance shown in FIG. 1 consists of a main frame 10 to which the model is to be connected, and a sub-frame 11 which is fixed to the ground or other fixed structure, through three stiff supports 12 (see FIG. 2). The supports 12 pass through apertures 13 in the frame 10 with a clearance, so that the frame 10 can move relatively to the sub-frame 11.

The frame 10 is connected to the sub-frame 11 through six separate links 15, 16, 17, 18, 19 and 20. Each of the links is supported between a pair of location points, one on frame 10 and one on sub-frame 11. For example, link 18 extends horizontally and is supported between horizonally spaced posts 21 and 22. Post 22 is fixed to frame 10 and post 21 to sub-frame 11. At each end link 18 is joined to the adjacent post. Each link is mounted in a similar manner, joined at each end, thus link 17 is supported between vertically aligned posts 23 and 24 on the sub-frame and frame respectively.

FIGS. 3 and 4 show the link 18 which consists of a ring 32 with integral extensions 25 diametrically opposite each other. Each extension 25 has a circular hole 26 into which is press fitted a commercially available mounting 27 known as a "Silentbloc" (registered trade mark) mounting. The mounting 27 consists of an inner metal bush 28 and an outer metal bush 29 between which is compressed a bush 30 of elastomeric material, having negligible hysteresis such as natural rubber. The inner metal bush 28 is longer than the thickness of the extension 25 and is securely bolted to the appropriate post 21 or 22. The rubber bush 30 will accommodate any very slight movement between the two posts 21, 22 so that the ring 32 will only be distorted by end loading in the link 18.

Strain gauges 31 are mounted on the outside and inside of the ring 32 and measure end loads on the link 18.

It will be seen that the six links physically separate the different modes. The links 15, 18 and 20 extend horizontally, and the links 16, 17 and 19 extend vertically. The moments in three orthogonal planes are measured as follows:

The difference between the forces measured in links 16 and 17 multiplied by half the distance between them gives the roll moment.

Similarly, the difference between the force in link 19 and the sum of the forces in links 16 and 17 multiplied by half the distance between them gives pitch moment.

Similarly, the difference between the forces in links 15 and 20 multiplied by half the distance between them gives yaw moment.

Lift forces will be measured by the sum of the forces in links 16, 17 and 19, lateral forces by the sum of links 15 and 20, and drag forces by link 18, giving the three corresponding directions of force measurement.

Movement of the frame 10 in any one mode will produce very slight movement of the other links not involved in the measurement of that mode. This movement is accommodated by the rubber bushes.

This type of balance is particularly useful in testing models of full-size vehicles in wind tunnels, in cases where the vehicle would normally run over the ground or a track. The sub-frame 11 can be connected directly to the track and the model supported in its proper position relative to the track on the frame 10. An example of the use of the balance in testing a tracked hovercraft or hovertrain is illustrated in FIG. 5. The track 35 is adapted to be fixed to the floor of the wind tunnel at any required azimuth setting. The sub-frame 11 is attached by bolts 36 to the track 35. The model of the hovertrain 37 is attached to the frame 10. The details of the balance shown in FIG. 5 are exactly as shown in FIGS. 1 and 2. It will be noted that the balance is located entirely within the model and is extremely compact.

We claim:

1. A balance for testing models or other apparatus in a wind tunnel, comprising a first frame adapted to be connected to the apparatus, a second frame which in use is attached to ground or to a fixed structure, and means for connecting said first and second frames together consisting of six separate links each connected to the two frames by mountings including a bush of elastomeric material, said links being adapted together to sense the three forces and three moments which are produced on the apparatus in three mutually perpendicular planes, said links being arranged to sense end-loading only.

2. A balance as claimed in claim 1, wherein the links are in the form of rings.

3. A balance for testing a model or other apparatus, comprising a first frame adapted to be connected to the apparatus, a second frame which in use is attached to ground or a fixed structure, a plurality of links each attached by a pair of mountings to, and extending between, said first and second frames so as separately to interconnect the frames, said links being adapted together to sense the three forces and three moments which are produced on the apparatus in three mutually perpendicular planes, and strain gauge means on each of said links for providing a measure of the load applied to the link, each of said mountings including elastomeric material whereby the mounting is capable of transmitting to the respective link only those loads which are directed longitudinally of the link between the mountings thereof.

4. A balance for testing a model or other apparatus, comprising a first frame adapted to be connected to the apparatus, a second frame which in use is attached to ground or to a fixed structure, six links each extending along an axis between a pair of terminal ends, a mounting attaching one end of each link to the first frame and a mounting attaching the other end of each link to the second frame, a first one of said links in use having its axis horizontal and directed longitudinally of the apparatus so as to be loaded by a drag force on the apparatus, second and third ones of said links being disposed with their axes vertical and spaced apart in a transversely directed plane so as to be differentially loaded by a rolling moment on the apparatus, a fourth one of said links being disposed with its axis vertical and spaced longitudinally of the apparatus from said transversely directed plane of said second and third links, the second and third links in combination and the fourth link being thereby differentially loaded by a pitching moment on the apparatus and being additively loaded by a heaving force on the apparatus, and fifth and sixth ones of the links being disposed with their axes horizontal and lying in transversely directed planes which are spaced apart longitudinally of the apparatus so as to be differentially loaded by a yawing moment on the apparatus and additively loaded by a lateral force on the apparatus, each of said mountings being arranged to transmit to the associated link only force which is directed along the link axis, and strain gauge means mounted on each link for measuring the axial loading of the link.

5. A balance as claimed in claim 4, wherein each link comprises a ring strain member having the terminal ends thereof disposed diametrically opposite one another.

6. A balance according to claim 4, wherein said first and second frames comprise two plate members arranged one above the other in generally horizontal planes with the links therebetween, and the terminal ends of the links are connected to the plate members by mountings each of which comprises a bush of elastomeric material.

7. In combination with a balance as claimed in claim 1, an apparatus to be tested in a wind tunnel, the balance being located entirely within the apparatus.

References Cited

UNITED STATES PATENTS

| 2,440,706 | 5/1948 | Tint | 73—141(A) |
|---|---|---|---|
| 2,597,751 | 5/1952 | Ruge | 73—141 |
| 2,918,816 | 12/1959 | Ormond | 73—147 |

S. CLEMENT SWISHER, Primary Examiner

U.S. Cl. X.R.

73—141